United States Patent
Yahagi

[11] Patent Number: 6,014,268
[45] Date of Patent: Jan. 11, 2000

[54] TWO-GROUP SMALL ZOOM LENS

[75] Inventor: Satoshi Yahagi, Saitama, Japan

[73] Assignee: Fuji Photo Optical Co., Ltd., Omiya, Japan

[21] Appl. No.: 09/024,265

[22] Filed: Feb. 17, 1998

[30] Foreign Application Priority Data

Apr. 30, 1997 [JP] Japan ................................ 9-126508

[51] Int. Cl.$^7$ .................................................. G02B 15/14
[52] U.S. Cl. .......................................... 359/691; 359/682
[58] Field of Search ..................................... 359/691, 680, 359/681, 682, 676, 683

[56] References Cited

U.S. PATENT DOCUMENTS

| | | | |
|---|---|---|---|
| 4,169,660 | 10/1979 | Nakamura | 359/681 |
| 4,266,860 | 5/1981 | Hayashi | 359/681 |
| 4,540,249 | 9/1985 | Mogami | 359/681 |
| 5,552,937 | 9/1996 | Ono et al. | 359/691 |
| 5,781,349 | 7/1998 | Sugawara | 359/691 |
| 5,844,724 | 12/1998 | Foo | 359/691 |

*Primary Examiner*—Georgia Epps
*Assistant Examiner*—Jordan M. Schwartz
*Attorney, Agent, or Firm*—Arnold International; Bruce Y. Arnold

[57] ABSTRACT

An inexpensive, high performance zoom lens includes, as measured from the object side, a negative first lens group and a positive second lens group. The overall length of the zoom lens is reduced by making one of the lens element surfaces of the first lens group $G_1$ aspherical. A lens element in the second lens group is designed to be a biconvex lens with the same absolute value of radii of curvature, to thereby make the zoom lens inexpensive to produce and assemble.

4 Claims, 6 Drawing Sheets

TWO-GROUP SMALL ZOOM LENS

BACKGROUND OF THE INVENTION

In recent years, digital cameras have been rapidly becoming smaller and the image size decreasing from ⅓ inch to ¼ inch, thus increasing the demand for smaller lenses. Moreover, reduction of the number of lens elements and simplification of lens structure is being achieved in order to make the lenses smaller and to reduce the cost. However, there is a limitation in making an individual lens element of a lens group smaller due to restrictions imposed by production considerations. Hence it becomes important to arrange lenses having shapes that meet a production specification while satisfying a lens size requirement and maintaining good lens performance.

In a two-group zoom lens with a short overall length, the number of lens elements is naturally limited. Moreover, decreasing the number of lens elements results in a reduction in the number of parameters which are available for correction of aberrations, thus making it more difficult to attain a required optical performance. Furthermore, in the case of a lens in a smaller overall system, the space between a stop and a CCD image surface inherently becomes smaller, making it more difficult to move the position of the exit pupil away from the image surface by a certain distance. This causes the incident angle of light rays entering the image surface to become large and produces shading. In short, it has been difficult to satisfy the two opposing requirements of maintaining good optical performance and decreasing the size of the lens. Moreover, in digital cameras in particular, the quality of the still image is an important consideration; hence, distortion at the boundary of the image must be small.

BRIEF SUMMARY OF THE INVENTION

The present invention relates to a small zoom lens which is used in home video cameras and digital cameras, particularly to a two-group small zoom lens with a zoom ratio of 200%–300%. The present invention aims to provide an inexpensive and high performance two-group small zoom lens with shorter total lens length in the lens system of a camera, thus achieving a smaller size camera.

A two-group small zoom lens of the present invention comprises, in order from the object side, a first lens group having a negative refractive power, and a second lens group having a positive refractive power. The overall focal length of the zoom lens is varied by varying the spacing between the two lens groups. The first lens group comprises, in order from the object side: a first lens element which has a negative refractive power, with either the object-side surface or the image-side surface being aspherical; a second lens element which has a negative refractive power and which is meniscus-shaped with its convex surface on the object side; and a third lens element which has a positive refractive power. The first lens element is meniscus-shaped, with its convex surface on the object side, and the third lens element is meniscus-shaped, with its convex surface on the object side. The second lens group comprises, in order from the object side: a positive fourth lens element, a positive fifth lens element, a negative sixth lens element, and a positive seventh lens element.

In other words, a two-group zoom system with the front group having a negative refractive power and the rear group having a positive refractive power is used in order to move the position of the exit pupil as far away as possible from the image plane. Moreover, an aspherical surface is used in the first lens group in order to attain better aberration correction.

BRIEF DESCRIPTION OF DRAWINGS

The present invention will become more fully understood from the detailed description given below and the accompanying drawings, which are given by way of illustration only and thus are not limitative of the present invention, wherein.

DETAILED DESCRIPTION

Figure 1:
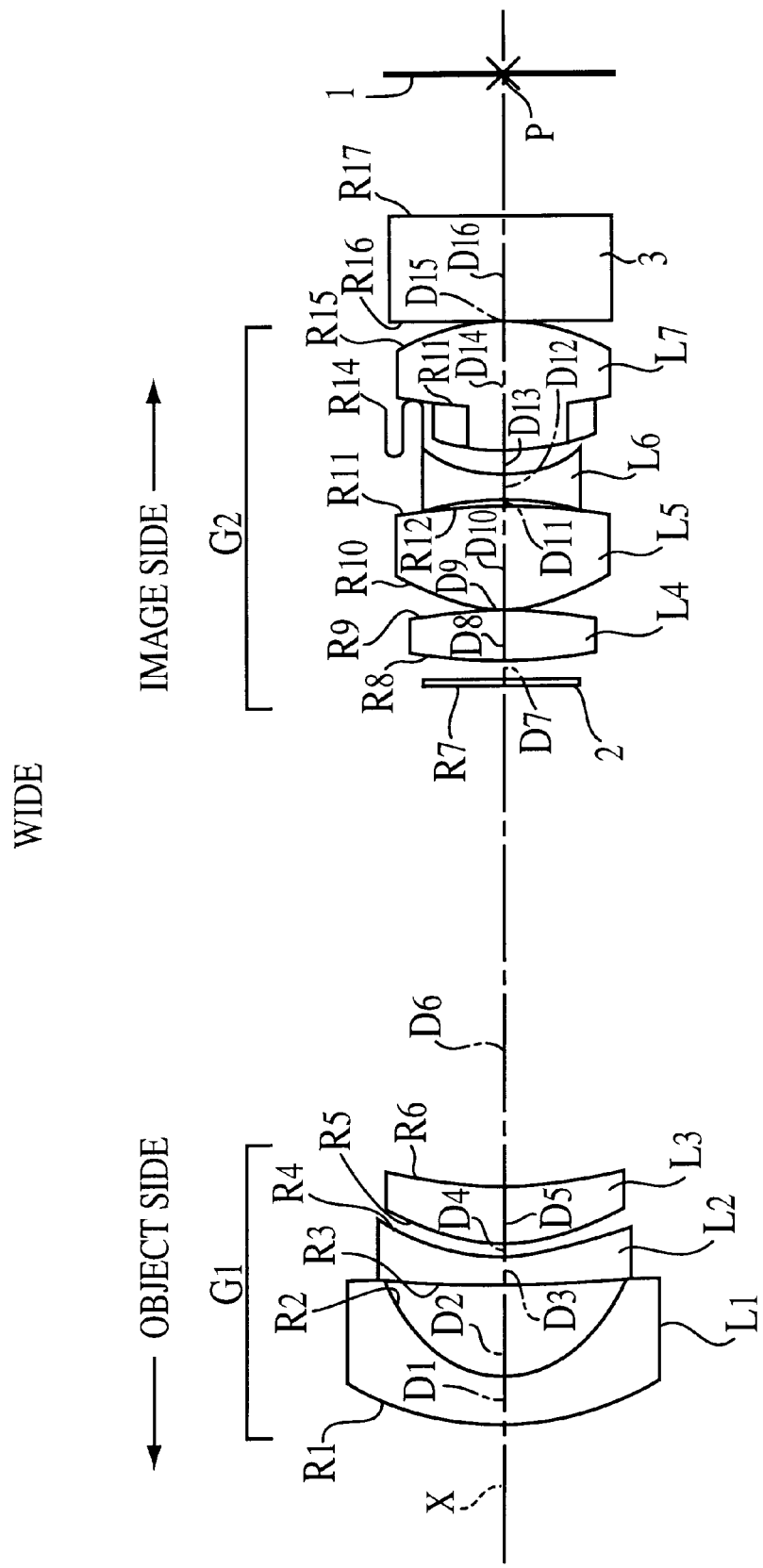
FIG. 1 is a schematic diagram describing the basic lens structure of embodiments 1 and 2 of the present invention.

The two-group small zoom lens of the present invention will now be described with reference to FIG. 1 of the drawings. The two-group zoom lens comprises, in order from the object side, a first lens group $G_1$ having a negative refractive power and a second lens group $G_2$ having a positive refractive power. Zooming, i.e., varying the overall focal length of the lens, is accomplished by varying the spacing between the two lens groups.

The first lens group $G_1$ comprises, in order from the object side, a first lens element $L_1$ of negative refractive power and having a meniscus shape with its convex surface on the object side, a second lens element $L_2$, and a third lens element of positive refractive power and having a meniscus shape with its convex surface on the object side. The second lens group $G_2$ comprises, in order from the object side, a fourth lens element $L_4$ composed of a biconvex lens having two surfaces with the same absolute value of curvature, a fifth lens element $L_5$ composed of a biconvex lens having a stronger curvature surface on the object side, a sixth lens element $L_6$ composed of a biconcave lens having a stronger curvature surface on the image-side, and a seventh lens element $L_7$ composed of a biconvex lens having a stronger curvature surface on the image-side. Light rays entering from the object side are imaged onto an image plane, such as onto a CCD array positioned at the image plane.

Moreover, a stop 2 is arranged in the second lens group $G_2$ so as to be closest to the object. Furthermore, one of the lens surfaces of the first lens element $L_1$ (the surface on the image side in embodiment 1 and the surface on the object side in embodiment 2) is made to be aspherical, making ray correction particulary effective at a position where the height of the off-axis light ray is sufficiently high. If each lens element in the first lens group $G_1$ were to be composed only of spherical surfaces, the number of lens elements would need to be increased in order to sufficiently correct for aberrations, causing the overall length of the zoom lens to become undesirably long.

Of course, production costs of a lens surface are generally higher for an aspherical surface than for a spherical surface, but the use of one or more aspherical surfaces can reduce the total number of lens elements that are required in order to attain a specified optical performance. On the other hand, using many aspherical surfaces and reducing the total number of lens elements in order to reduce production costs will result in concentration of refractive power in a small number of lens elements, causing the system to be extemely sensitive to axial shift, etc., which makes the lens very difficult to assemble. In the present invention, only one aspherical surface is employed (in the first lens group) in order to achieve very low distortion aberration, as required for digital cameras and the like and, at the same time, to control production costs as discussed above.

Moreover, the surfaces of all the lens elements in the second lens group $G_2$ are spherical, and two positive lens elements (the fourth lens element $L_4$ and the fifth lens element $L_5$) are provided in order to correct spherical aberration. These two lens elements are made so as to balance the refractive power, thereby preventing the assembly process from becoming overly sensitive. Moreover, the fifth lens element $L_5$ and the sixth lens element $L_6$ serve to correct axial chromatic aberration, and the sixth lens element $L_6$ and the seventh lens element $L_7$ serve to correct lateral color. Moreover, production costs are held down by employing, for the fourth lens element $L_4$, a so-called "same R" lens (one which has the same radius of curvature for the front and rear surface). A filter unit 3 such as an infrared light blocking filter, a low pass filter or the like may be arranged between the seventh lens element $L_7$ and the image plane 1 having an on-axis point P.

Figure 2:
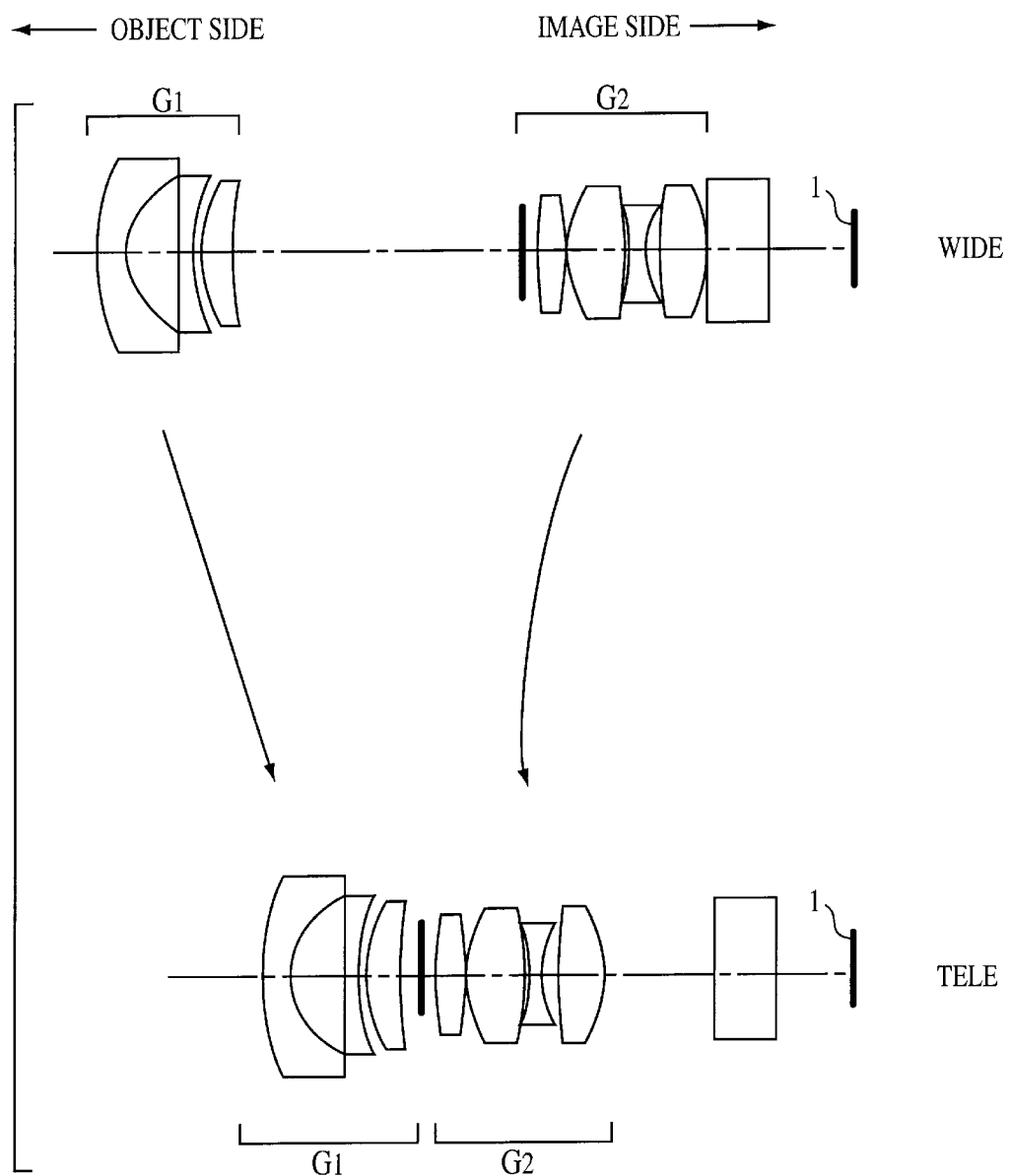
FIG. 2 illustrates the approximate lens group positions at the maximum wide-angle state versus the maximum telephoto state for embodiments 1 and 2.

FIG. 2 illustrates the approximate lens group positions at the maximum wide-angle state versus the maximum telephoto state for embodiments 1 and 2. Two embodiments of the present invention will now be described using actual numerical values.

Embodiment 1

Table 1 shows the values of the radius of curvature R (in mm) of each lens surface, the on-axis surface spacing D (in mm), as well as the values of the index of refraction $N_d$ and the Abbe number $V_d$ (for the sodium d line) of each lens element of embodiment 1. The surface numbers # in the table indicate the surface order from the photographic object side. In addition, the surface with a * to the right of the surface number in Table 1 is made to be aspheric, with an aspheric shape as indicated in equation (1) and Table 2 below.

TABLE 1

| # | R | D | $N_d$ | $v_d$ |
|---|---|---|---|---|
| 1 | 14.610 | 1.50 | 1.68800 | 55.9 |
| 2* | 4.081 | 3.20 | | |
| 3 | 65.049 | 1.00 | 1.77250 | 49.6 |
| 4 | 11.071 | 0.45 | | |

TABLE 1-continued

| # | R | D | $N_d$ | $v_d$ |
|---|---|---|---|---|
| 5 | 8.368 | 1.96 | 1.72824 | 28.3 |
| 6 | 24.483 | variable distance 1 | | |
| 7 | ∞ | 0.80 | | |
| 8 | 26.502 | 1.67 | 1.71300 | 53.9 |
| 9 | −26.502 | 0.10 | | |
| 10 | 7.244 | 3.55 | 1.80501 | 39.6 |
| 11 | −30.617 | 0.14 | | |
| 12 | −14.141 | 1.00 | 1.84665 | 23.9 |
| 13 | 5.434 | 0.92 | | |
| 14 | 21.449 | 2.82 | 1.71300 | 53.9 |
| 15 | −8.145 | variable distance 2 | | |
| 16 | ∞ | 3.50 | 1.51633 | 64.0 |
| 17 | ∞ | | | |

Moreover, the two-group small zoom lens of the present invention is structured in such a manner that the following equation (1) is satisfied so as to obtain favorable aberration correction while holding the production costs down.

$$Z=Cy^2/(1+(1-KC^2y^2)^{1/2})+A_4y^4+A_6y^6+A_8y^8+A_{10}y^{10} \quad \text{(Equation 1)}$$

where
Z is the distance of a point on the aspherical surface from the tangential plane to the lens element surface vertex,
C is the curvature (1/R) of aspherical surface vertex,
K is the conical constant,
$A_4$–$A_{10}$ are coefficient constants of the 4th, 6th, 8th and 10th exponential number terms, respectively, and
y is the height from optical axis.

Table 2 gives the values of the coefficients used in Equation 1 for the aspheric surface, the limits of variable distances 1 and 2, and the ranges of the focal length f and the F number $F_{No.}$ of the overall zoom lens system for embodiment 1 of the invention.

TABLE 2

| # | C | K | $A_4$ | $A_6$ | $A_8$ | $A_{10}$ |
|---|---|---|---|---|---|---|
| 2 | 0.24506 | 0.56384 | $8.9390 \times 10^5$ | $-5.0000 \times 10^{-8}$ | $-9,2860 \times 10^{-11}$ | $1.4862 \times 10^{13}$ |

| | Maximum wide-angle state | Maximum telephoto state |
|---|---|---|
| Variable distance 1 | 17.38 | 1.34 |
| Variable distance 2 | 0.0 | 6.57 |
| f = 3.37–9.44 mm | $F_{No.}$ = 2.40–3.30 | |

Embodiment 2

Table 3 below shows the values of the radius of curvature R (in mm) of each lens element surface, the on-axis surface spacing D (in mm), as well as the values of the index of refraction $N_d$ and the Abbe number $v_d$ (for the sodium d line) of each lens element of embodiment 2. The surface numbers # in the table indicate the surface order from the photographic object side. In addition, the surface with a * to the right of the surface number in Table 3 is made to be aspheric, with an aspheric shape as indicated in equation (1) above and Table 4 below.

TABLE 3

| # | R | D | $N_d$ | $v_d$ |
|---|---|---|---|---|
| 1* | 21.362 | 1.70 | 1.69081 | 53.0 |
| 2 | 5.150 | 2.68 | | |

TABLE 3-continued

| # | R | D | $N_d$ | $v_d$ |
|---|---|---|---|---|
| 3 | 50.445 | 1.00 | 1.77250 | 49.6 |
| 4 | 7.742 | 0.95 | | |
| 5 | 8.241 | 2.07 | 1.72824 | 28.3 |
| 6 | 28.793 | variable distance 1 | | |
| 7 | ∞ | 0.80 | | |
| 8 | 26.502 | 1.67 | 1.71300 | 53.9 |
| 9 | −26.502 | 0.10 | | |
| 10 | 7.244 | 3.55 | 1.80501 | 39.6 |
| 11 | −30.617 | 0.14 | | |
| 12 | −14.141 | 1.00 | 1.84665 | 23.9 |
| 13 | 5.434 | 0.92 | | |
| 14 | 21.449 | 2.82 | 1.71300 | 53.9 |
| 15 | −8.145 | variable distance 2 | | |
| 16 | ∞ | 3.50 | 1.51633 | 64.0 |
| 17 | ∞ | | | |

Table 4 gives the values of the coefficients used in Equation 1 for the aspheric surface, the limits of variable distances 1 and 2, and the ranges of the focal length f and the F number $F_{No.}$ of the overall zoom lens system for embodiment 2 of the invention.

TABLE 4

| # | C | K | $A_4$ | $A_6$ | $A_8$ | $A_{10}$ |
|---|---|---|---|---|---|---|
| 1 | 0.04681 | 4.70244 | $1.5087 \times 10^{-4}$ | $2.2011 \times 10^{-7}$ | $2.9843 \times 10^{-9}$ | $-5.6184 \times 10^{-12}$ |

| | Maximum wide-angle state | Maximum telephoto state |
|---|---|---|
| Variable distance 1 | 17.08 | 1.30 |
| Variable distance 2 | 0.0 | 6.68 | f = 3.37–9.43    $F_{No.}$ = 2.39–3.33

Figure 3:
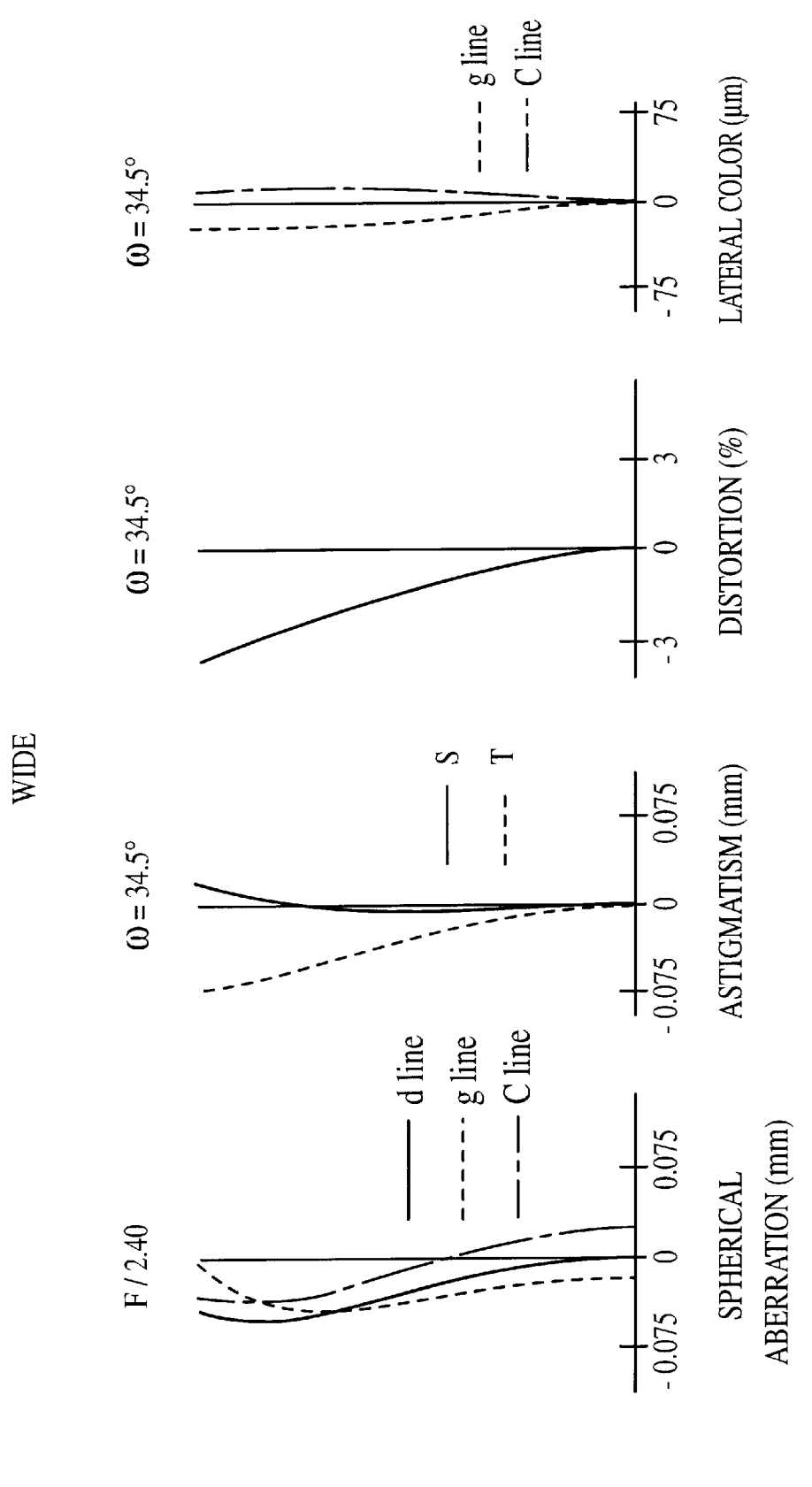
FIG. 3 illustrates the spherical aberration, astigmatism, distortion and lateral color of the lens of embodiment 1 at the maximum wide-angle state.
Figure 4:
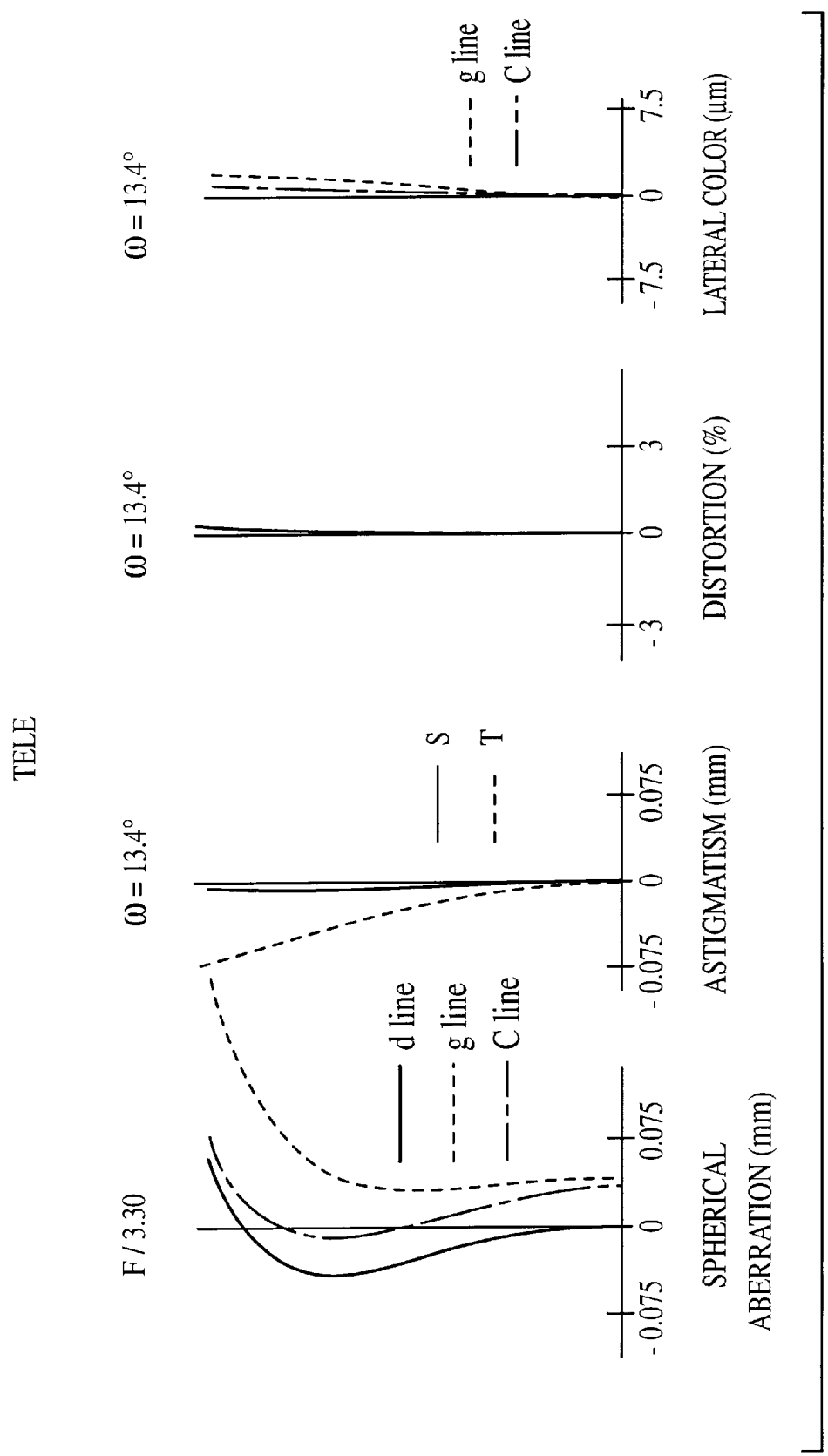
FIG. 4 illustrates the spherical aberration, astigmatism, distortion and lateral color of the lens of embodiment 1 at the maximum telephoto state.
Figure 5:
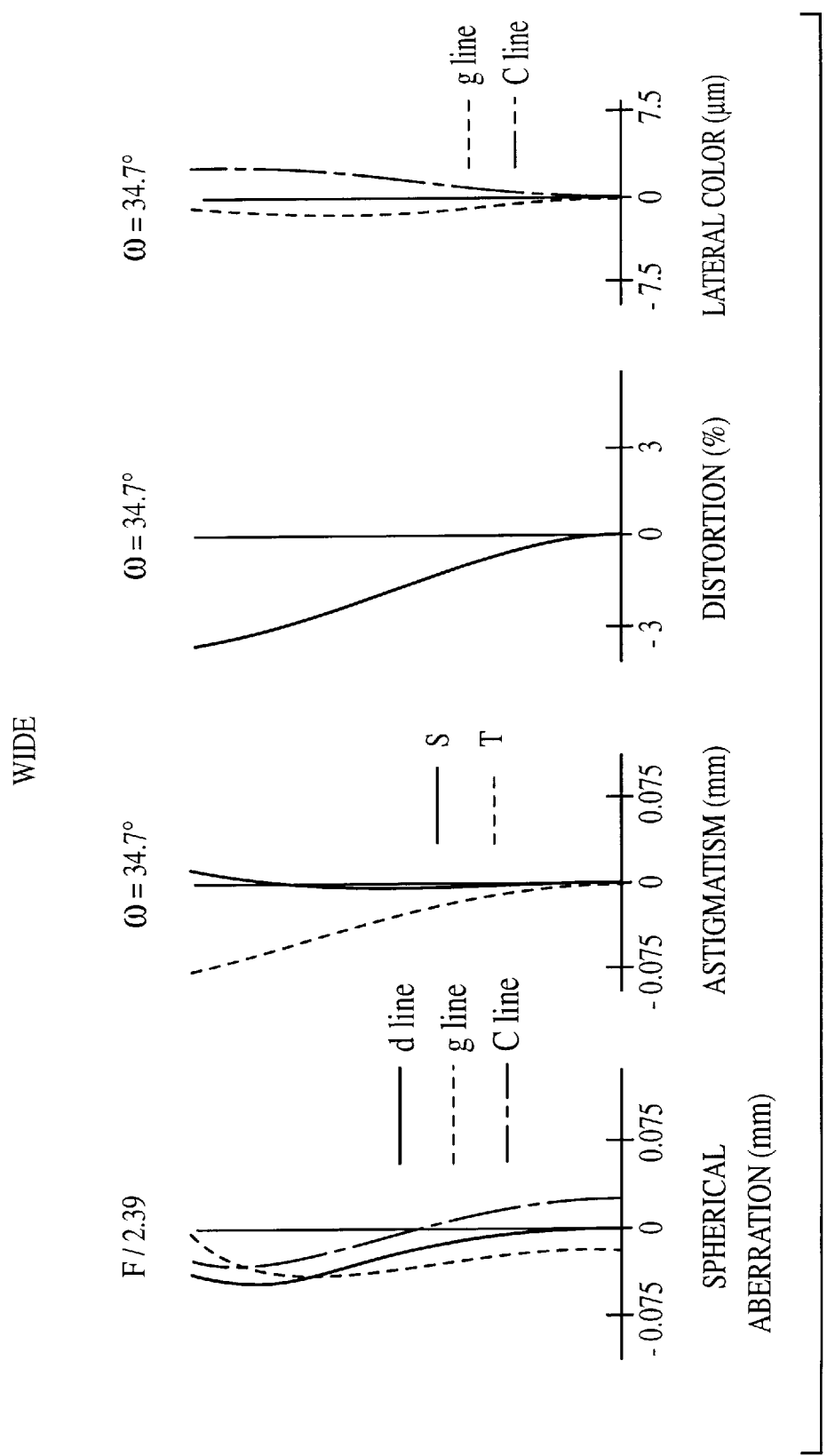
FIG. 5 illustrates the spherical, aberration, astigmatism, distortion and lateral color of the lens of embodiment 2 at the maximum wide-angle state; and, FIG. 6 illustrates the spherical aberration, astigmatism, distortion and lateral color of the lens of embodiment 2 at the maximum telephoto state.
Figure 6:
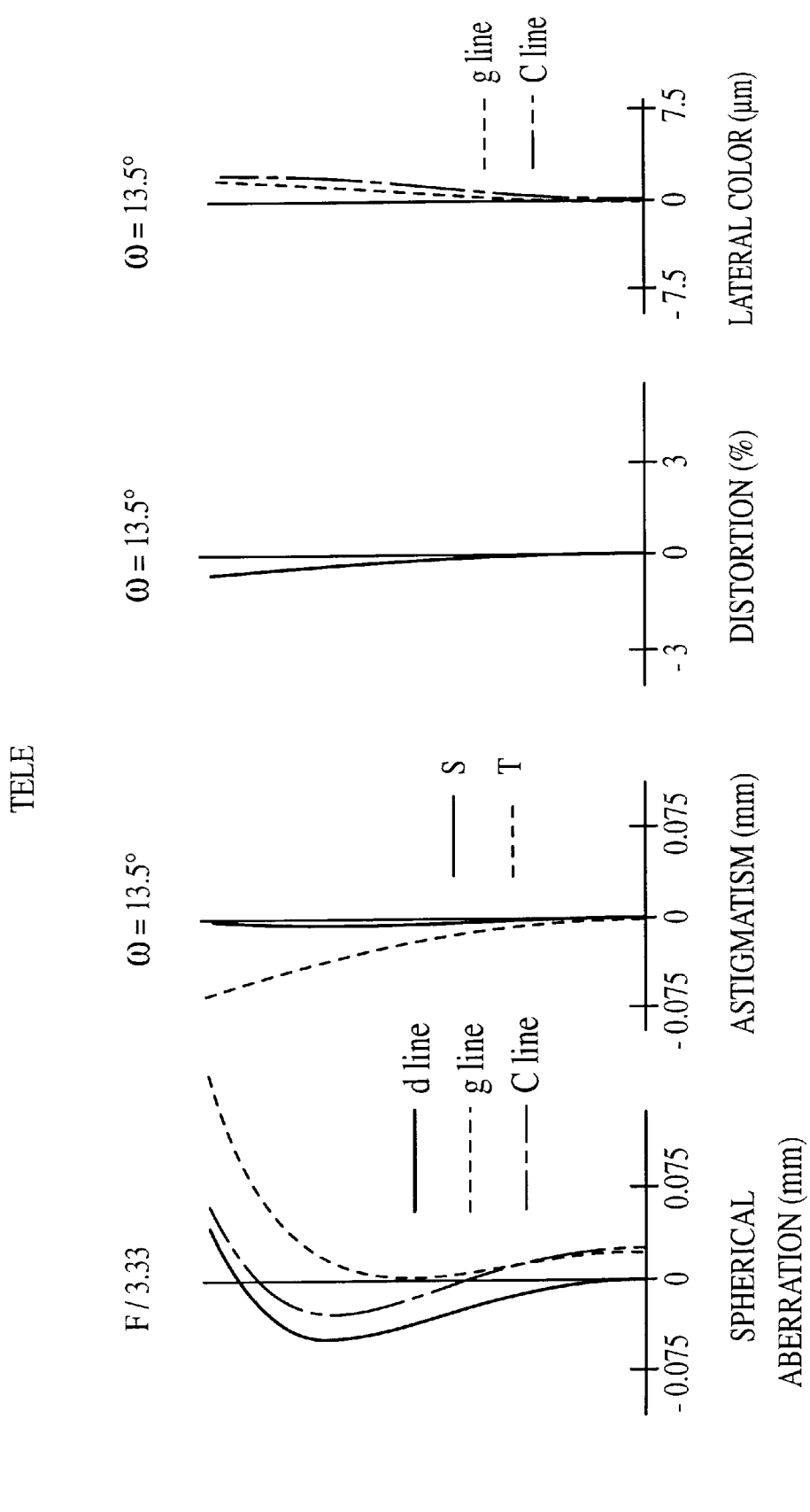

Moreover, the spherical aberration, astigmatism, distortion, and lateral color at the maximum wide-angle state are given in FIG. 3 for embodiment 1 and in FIG. 5 for embodiment 2. The spherical aberration, astigmatism, distortion, and lateral color at the maximum telephoto state are given in FIG. 4 for embodiment 1 and in FIG. 6 for embodiment 2. Here, ω in each aberration chart represents the half-field angle. FIGS. 3–6 clearly illustrate that favorable aberrations are attained for each embodiment of the invention.

As described above, in the two-group small zoom lens of the present invention, the fourth lens element $L_4$ is composed of a biconvex lens having two surfaces with the same curvature, which enables sharing of lens formation member, thus contributing to production cost reduction. Morever, implementation of an aspherical surface in one of the lens surfaces of the first lens element $L_1$ enables correction at a position where the height of the off-axis light rays is sufficiently high to enable effective aberration correction, thus resulting in a system in which various aberrations, including distortion, are made favorable while holding production costs down.

The invention being thus described, it will be obvious that the same may be varied in many ways. Such variations are not to be regarded as a departure from the spirit and scope of the invention. For example, rather than the aspheric surfaces being formed by figuring a spherical surface, these surfaces may be formed directly by spin casting or using a mold or die. Also, the appropriate selection of the shape of the lens elements which comprise each of the lens groups, the number of aspheric surfaces, and the shape of the aspheric surfaces may be varied. All such modifications as would be obvious to one skilled in the art are intended to be included within the scope of the following claims.

What is claimed is:

1. A zoom lens comprising, in order from a photographic object side:

a first lens group having a negative refractive power;

a second lens group having a positive refractive power;

said first lens group including the following adjacent lens elements, in order from the photographic object side, a first lens element having a meniscus shape and negative refractive power with its convex surface on the photographic object side, said first lens element being the most object-side lens element of said zoom lens and including a surface which is aspherical, a second lens element having a meniscus shape and negative refractive power with its convex surface on the photographic object side; and a third lens element which has a positive refractive power and a meniscus shape with its convex surface facing the photographic object side;

wherein the overall focal length of the zoom lens is varied by varying the spacing between said first lens group and said second lens group, and said second lens group comprising, on the most object-side of said second lens group, a fourth lens element of positive refractive power, said fourth lens element satisfying the following equation:

$$|R_{4F}/R_{4R}|=1.0$$

wherein $R_{4F}$ and $R_{4R}$ respectively represent the radius of curvature of the object-side surface and the radius of curvature of the image-side surface of said fourth lens element.

2. The zoom lens as set forth in claim 1, and further comprising said zoom lens having the construction parameters as set forth below:

| # | R | D | $N_d$ | $v_d$ |
|---|---|---|---|---|
| 1 | 14.610 | 1.50 | 1.68800 | 55.9 |
| 2* | 4.081 | 3.20 | | |
| 3 | 65.049 | 1.00 | 1.77250 | 49.6 |
| 4 | 11.071 | 0.45 | | |
| 5 | 8.368 | 1.96 | 1.72824 | 28.3 |
| 6 | 24.483 | variable distance 1 | | |
| 7 | ∞ | 0.80 | | |
| 8 | 26.502 | 1.67 | 1.71300 | 53.9 |
| 9 | −26.502 | 0.10 | | |
| 10 | 7.244 | 3.55 | 1.80501 | 39.6 |
| 11 | −30.617 | 0.14 | | |

-continued

| # | R | D | $N_d$ | $v_d$ |
|---|---|---|---|---|
| 12 | −14.141 | 1.00 | 1.84665 | 23.9 |
| 13 | 5.434 | 0.92 | | |
| 14 | 21.449 | 2.82 | 1.71300 | 53.9 |
| 15 | −8.145 | variable distance 2 | | |
| 16 | ∞ | 3.50 | 1.51633 | 64.0 |
| 17 | ∞ | | | | wherein surface 2 is made to be aspheric, the distances given are in mm, variable distance 1 is from 17.38–1.34 mm, and variable distance 2 is from zero to 6.57 mm.

3. The zoom lens as set forth in claim 4, and further comprising said zoom lens having the construction parameters as set forth below:

| # | R | D | $N_d$ | $v_d$ |
|---|---|---|---|---|
| 1* | 21.362 | 1.70 | 1.69081 | 53.0 |
| 2 | 5.150 | 2.68 | | |
| 3 | 50.445 | 1.00 | 1.77250 | 49.6 |
| 4 | 7.742 | 0.95 | | |
| 5 | 8.241 | 2.07 | 1.72824 | 28.3 |

-continued

| # | R | D | $N_d$ | $v_d$ |
|---|---|---|---|---|
| 6 | 28.793 | variable distance 1 | | |
| 7 | ∞ | 0.80 | | |
| 8 | 26.502 | 1.67 | 1.71300 | 53.9 |
| 9 | −26.502 | 0.10 | | |
| 10 | 7.244 | 3.55 | 1.80501 | 39.6 |
| 11 | −30.617 | 0.14 | | |
| 12 | −14.141 | 1.00 | 1.84665 | 23.9 |
| 13 | 5.434 | 0.92 | | |
| 14 | 21.449 | 2.82 | 1.71300 | 53.9 |
| 15 | −8.145 | variable distance 2 | | |
| 16 | ∞ | 3.50 | 1.51633 | 64.0 |
| 17 | ∞ | | | | wherein surface 1 is made to be aspheric, the distances and spacing are given in mm, variable distance 1 is from 17.08–1.30 mm and variable distance 2 is from zero to 6.68 mm.

4. The zoom lens as set forth in claim 1, wherein said zoom lens includes only a single aspherical surface.

\* \* \* \* \*

UNITED STATES PATENT AND TRADEMARK OFFICE
CERTIFICATE OF CORRECTION

PATENT NO : 6,014,268
DATED     : Jan. 11, 2000
INVENTOR(S): Yahagi

It is certified that error appears in the above-identified patent and that said Letters Patent is hereby corrected as shown below:

In Table 2, col. 4, change the exponent from plus 5 to minus 5.
In Table 2, col. 7, change the exponent from plus 13 to minus 13.
In Claim 3, line 1, change "in claim 4" to --in claim 1--.

Signed and Sealed this

First Day of August, 2000

Attest:

Q. TODD DICKINSON

*Attesting Officer*  *Director of Patents and Trademarks*